G. W. SPRINGSTEEN & H. W. WEED.
FOLDING BACK FOR SADDLES.
APPLICATION FILED APR. 17, 1914.
1,122,040.
Patented Dec. 22, 1914.
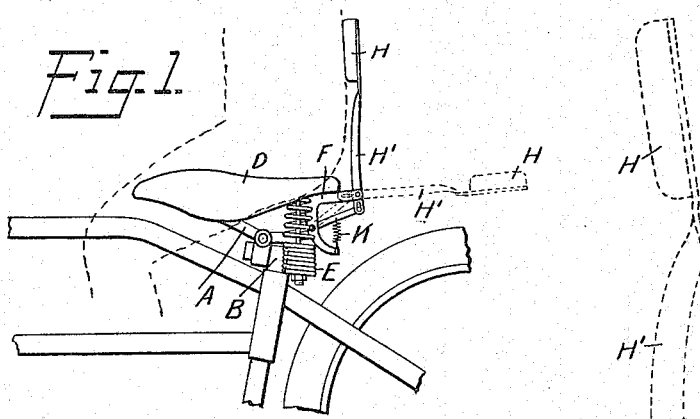
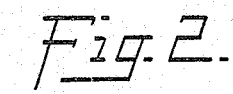
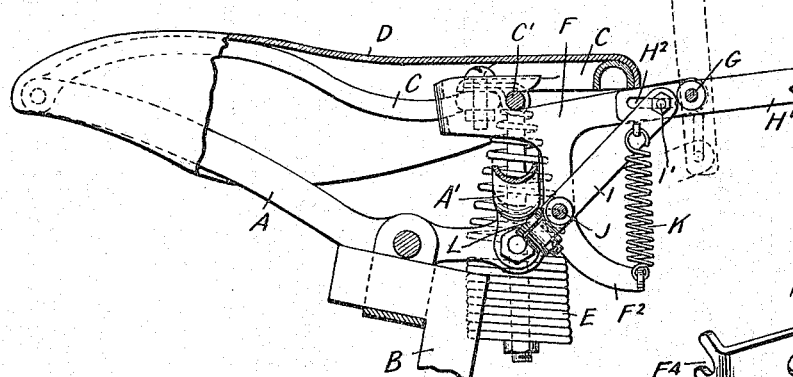
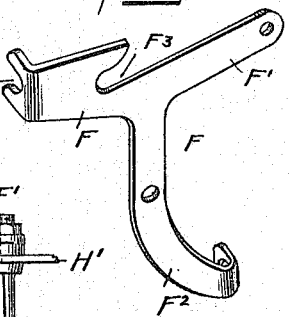
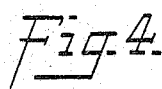
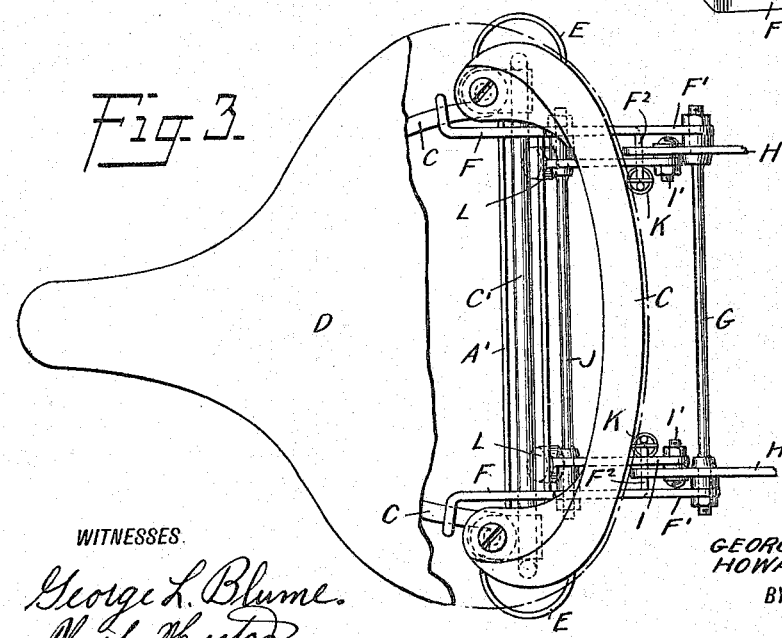
WITNESSES
INVENTORS
GEORGE W. SPRINGSTEEN
HOWARD W. WEED
BY
ATTORNEYS

UNITED STATES PATENT OFFICE.

GEORGE W. SPRINGSTEEN, OF NEW YORK, N. Y., AND HOWARD W. WEED, OF STAMFORD, CONNECTICUT.

FOLDING BACK FOR SADDLES.

1,122,040.      Specification of Letters Patent.      Patented Dec. 22, 1914.

Application filed April 17, 1914. Serial No. 832,526.

*To all whom it may concern:*

Be it known that we, GEORGE W. SPRINGSTEEN and HOWARD W. WEED, both citizens of the United States, and residents, respectively, of the city of New York, borough of Brooklyn, in the county of Kings and State of New York, and of Stamford, in the county of Fairfield and State of Connecticut, have invented a new and Improved Folding Back for Saddles, of which the following is a full, clear, and exact description.

The object of the invention is to provide a new and improved folding back for the saddles of motor cycles, bicycles, and other vehicles and devices, and arranged to normally hold the back in an inactive folded position to permit the rider to conveniently mount and dismount, and to automatically move the back into active position relatively to the saddle when the latter is occupied by the rider.

In order to accomplish the desired result, use is made of a saddle back normally in folded position relatively to the saddle seat, and means for moving the saddle back into active position relatively to the seat on the rider occupying the seat.

A practical embodiment of the invention is represented in the accompanying drawings forming a part of this specification, in which similar characters of reference indicate corresponding parts in all the views.

Figure 1 is a side elevation of the folding back as applied to the saddle of a motor cycle; Fig. 2 is an enlarged sectional side elevation of the same; Fig. 3 is a plan view of the same with part of the saddle seat broken out; and Fig. 4 is a perspective view of one of the brackets on which the folding back is mounted.

The supporting frame A of the saddle is attached in the usual manner to the seat post B of a motor cycle, bicycle or other vehicle on which the saddle is used, to the front end of the supporting frame A is pivoted the seat frame C covered with the usual seat D of leather or other material. The rear portion of the seat frame C is supported by spring devices E from the supporting frame A to allow the seat to swing downward by the weight of the rider when the latter occupies the seat D and to allow the seat D to return to uppermost position when relieved of the weight of the rider.

The construction so far described is that of an ordinary saddle as now generally used on motor cycles and bicycles, and further detail description of the same is not deemed necessary.

Brackets F, F are attached to the seat frame C and are provided with rearwardly extending arms F' and downwardly and rearwardly extending arms $F^2$, and the said arms F' carry a transverse pivot G on which are mounted to swing the side arms H' of a folding seat back H. The side arms H' are extended beyond the pivot G and the extending ends are provided with slots $H^2$ engaged by pivots I' held on levers I fulcrumed on a transverse rod J connecting the brackets F with each other and holding the same properly spaced apart, as plainly indicated in Fig. 3. Springs K connect the levers I with the terminals of the arms $F^2$ to exert a downward pressure on the said levers I with a view to swing the seat back H from a normal folded or approximately horizontal position into a vertical active position, as hereinafter more fully explained. The lower ends of the levers I are provided with adjustable stops L abutting against the under side of the cross bar A' forming part of the supporting frame A. It will be noticed that by this arrangement the levers I normally hold the arms H' of the seat back H in approximately horizontal folded position, as shown in Fig. 2, and by adjusting the stops L the arms H' may be moved into the desired normal position when applying the attachment to the saddle of a motor cycle, bicycle or the like.

When the seat D is unoccupied, the spring devices E hold the said seat D in uppermost position whereby the brackets F are likewise held in uppermost position and consequently the saddle back H is held in an approximately horizontal or folded position, as shown in Fig. 2, by the action of the spring-pressed levers I having their stops L abutting against the fixed cross bar A'. With the seat back H in this folded position the rider can readily mount the seat D from the rear in the usual manner without interference by the folded seat back H. When the rider occupies the said seat D the latter swings downward and in doing so the brackets F are carried along and the springs K now impart a downward swinging motion to the levers I and the latter now swing the seat back H upward into an approximately vertical active position, as shown in Fig. 1 and in dotted lines in Fig. 2. It is understood that the cross bar A' is immovable relatively to the seat D and the brackets F move downward with the said seat when the rider mounts the seat, and as the brackets F carry the pivot J downward the levers I are free to swing downward, as above described, the stops L abutting, however, at all times on the fixed cross bar A' to limit the downward swinging motion of the levers I. The stops L are preferably in the form of bolts screwing in the levers I and having their heads abutting against the cross bar A' to allow of adjusting the said stops in the levers I to move the seat back H into proper position to suit the convenience of the rider, the adjustment being also governed by the weight of the rider.

The brackets F are preferably constructed for convenient attachment to saddles now in use, and for this purpose each bracket F is provided with a hook F³ adapted to hook onto the cross bar C' of the seat frame C, and each bracket F is also provided in front of the hook F³ with a transversely extending fork F⁴ adapted to straddle the corresponding side bar of the seat frame C. The rearwardly extending arm F' of each bracket F abut with its upper edge against the under side of the curved rear member of the seat frame C. By the arrangement described the brackets F are securely held in place on the seat frome C and move up and down with the same, as previously explained and for the purpose described.

The outer ends of the pivot rod J are threaded and provided with nuts to permit of conveniently placing the brackets F in position on the said frame C.

Having thus described our invention, we claim as new and desire to secure by Letters Patent:

1. In combination, a saddle having a fixed member and a yieldingly mounted seat, brackets on the seat and connected with each other by a cross bar, each bracket having a hook for engagement with a cross bar of the saddle seat frame, each bracket having a transversely extending fork stradding a side bar of the seat frame and the top edge of each bracket abutting against the under side of the rear of the seat frame, a saddle-back having side arms fulcrumed on the said brackets and provided with slots, levers fulcrumed on the said brackets and having pins engaging the said slots, adjustable stops on the said levers and abutting against the said fixed member and springs attached at one end to the said levers and at the other end to the said brackets.

2. A saddle back attachment for saddles having a yieldingly mounted seat comprising brackets adapted to be attached to the yielding seat of the saddle, a saddle back mounted to swing on the said brackets, and spring-pressed levers fulcrumed on the said brackets and pivotally connected at one end with the said saddle back, the said levers having their other ends adapted to abut against a fixed member of the saddle.

3. In combination, a saddle having a fixed member and a yieldingly supported seat, a saddle back mounted to swing on the said seat, and a spring-pressed lever pivotally connected at one end with the said saddle back and engaging with its other end the said fixed member of the saddle.

4. In combination, a saddle having a fixed member and a yieldingly supported seat, a saddle back mounted to swing on the said seat, and a spring-pressed lever pivotally connected at one end with the said saddle back and provided at its other end with an adjustable stop abutting against the said fixed saddle member.

5. In combination, a saddle having a fixed member and a yieldingly mounted seat, brackets on the said seat, a saddle back having side arms fulcrumed on the said brackets and provided with slots, levers fulcrumed on the said brackets and having pins engaging the said slots, adjustable stops on the said levers and abutting against the said fixed member, and springs attached at one end to the said levers and at the other end to the said brackets.

6. A seat back attachment for saddles, provided with a supporting frame having brackets connected with each other by a cross bar, each bracket having a hook for engagement with a cross bar of the saddle seat frame, each bracket having a transversely extending fork straddling a side bar of the saddle frame, and the top edge of each bracket abutting against the under side of the rear of the seat frame.

In testimony whereof we have signed our names to this specification in the presence of two subscribing witnesses.

GEORGE W. SPRINGSTEEN.
HOWARD W. WEED.

Witnesses:
THEO. G. HOSTER,
PHILIP D. ROLLHAUS.